(12) United States Patent
Al-Damluji

(10) Patent No.: US 11,159,920 B2
(45) Date of Patent: Oct. 26, 2021

(54) PROCESSING SIGNALLING MESSAGES IN A NETWORK NODE

(71) Applicant: METASWITCH NETWORKS LTD, Enfield (GB)

(72) Inventor: Salem Al-Damluji, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 0 days.

(21) Appl. No.: 16/991,906

(22) Filed: Aug. 12, 2020

(65) Prior Publication Data

US 2021/0058749 A1 Feb. 25, 2021

(30) Foreign Application Priority Data

Aug. 20, 2019 (GB) ...................................... 1911927

(51) Int. Cl.
*H04W 4/12* (2009.01)

(52) U.S. Cl.
CPC ..................................... *H04W 4/12* (2013.01)

(58) Field of Classification Search
CPC . H04L 65/1006; H04L 67/34; H04L 65/1033; H04L 65/1066; H04L 69/22; H04L 65/1046; H04L 67/2823; H04W 4/12
USPC ...................................................... 455/412.1
See application file for complete search history.

(56) References Cited

U.S. PATENT DOCUMENTS

| 2007/0153813 A1* | 7/2007 | Terpstra | ................. | H04L 65/80 370/401 |
| 2009/0129388 A1 | 5/2009 | Akhtar et al. | | |
| 2016/0381093 A1* | 12/2016 | Novo Diaz | ............ | H04L 47/17 370/270 |

(Continued)

FOREIGN PATENT DOCUMENTS

| CN | 104660657 A | 5/2015 |
| EP | 2007105 A1 | 12/2008 |

(Continued)

OTHER PUBLICATIONS

Search Report for United Kingdom Patent Application No. GB1911927.0, dated Dec. 19, 2019, 4 pages.

*Primary Examiner* — Congvan Tran
(74) *Attorney, Agent, or Firm* — Newport IP, LLC; Han K. Gim

(57) ABSTRACT

A network node comprises a core processing part to perform a core processing function, an ingress processing part to receive incoming signaling messages, an egress processing part to output signaling messages for transmission from the network node, and a message manipulation function to manipulate signaling messages. In a first configuration, the message manipulation function is comprised in the ingress processing part, and in a second configuration the message manipulation function is comprised in the egress processing part. In the first configuration, an egress characteristic is determined, indicative of how an outgoing signaling message is to be outputted, and an incoming signaling message is manipulated based on the egress characteristic. In the (Continued)

second configuration, an ingress characteristic is determined, indicative of how an incoming signaling message has been received, and an outgoing signaling message is manipulated based on the ingress characteristic.

20 Claims, 9 Drawing Sheets

(56) References Cited

U.S. PATENT DOCUMENTS

| | | | | |
|---|---|---|---|---|
| 2018/0123949 A1* | 5/2018 | Tschirhart | ............ | H04L 65/1069 |
| 2019/0335533 A1* | 10/2019 | Combellas | .............. | H04W 4/90 |
| 2020/0374373 A1* | 11/2020 | Pratt | ................... | H04L 65/1069 |

FOREIGN PATENT DOCUMENTS

| | | | |
|---|---|---|---|
| EP | 2497245 | A1 | 9/2012 |
| EP | 2876859 | A1 | 5/2015 |

* cited by examiner

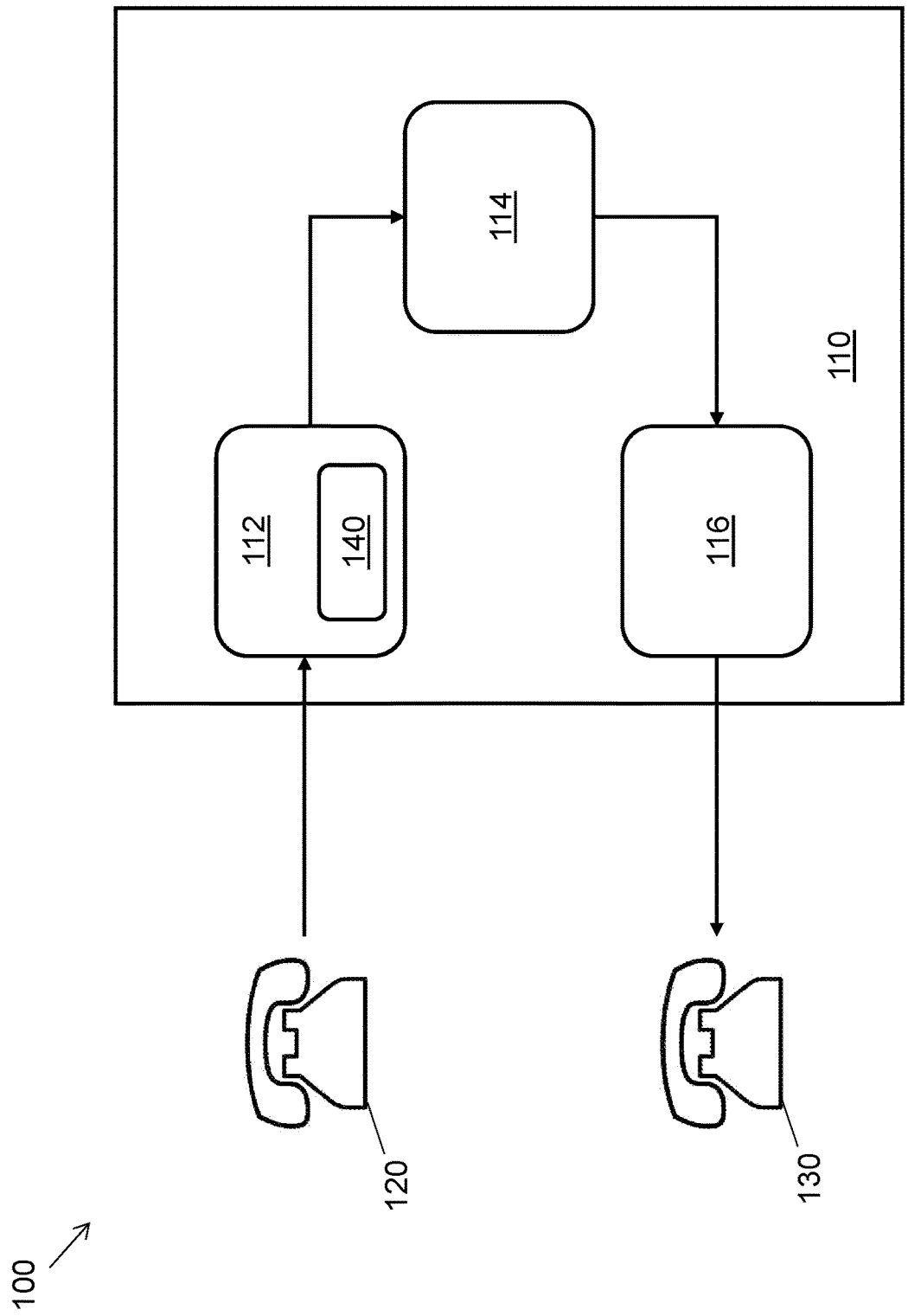

PROCESSING SIGNALLING MESSAGES IN A NETWORK NODE

CROSS REFERENCE TO RELATED APPLICATIONS

This application claims priority to United Kingdom (GB) Application No. 1911927.0, filed Aug. 20, 2019, the entire contents of which are incorporated herein by reference.

INTRODUCTION

Technical Field

The present disclosure relates to processing signaling messages in a network node. In particular, but not exclusively, the present disclosure relates to processing signaling messages in a network node in a telecommunications network.

BACKGROUND

Communication sessions such as voice or video calls are typically set up and/or managed using signaling messages. Such signaling messages may be formatted according to a session-based signaling protocol, e.g. the session initiation protocol (SIP). Signaling messages may follow a path from an endpoint device (e.g. a user terminal) to another endpoint device via one or more network nodes. An example of such a network node is a session border controller (SBC), which is typically deployed at the edge of a local network and on the boundary with a wide area network. The SBC is configured to police communication sessions (e.g. voice calls) that involve the local network.

A network node such as an SBC may be equipped with one or more message manipulation functions (MMFs). MMFs are used to manipulate signaling messages according to pre-defined message manipulation rules. For example, an MMF on a SIP network node may be configured to selectively add, remove or alter a header (e.g. a request line) or body of SIP messages.

Message manipulation is performed either before a signaling message is processed by the core processing function of the network node, or after the signaling message has been processed by the core processing function. In the former case, the MMF is configured to manipulate incoming signaling messages received at the network node. Such an MMF is thus configured as an ingress MMF (comprised at an ingress part of the network node). In the latter case, the MMF is configured to manipulate outgoing signaling messages to be output from the network node. Such an MMF is thus configured as an egress MMF (comprised at an egress part of the network node). Both ingress MMFs and egress MMFs may be employed in a given network node.

The use of such message manipulation functionality facilitates interoperability between network nodes. For example, an outgoing message may be modified prior to being sent such that its format is acceptable to a logically adjacent node that will receive the message. Similarly, a received message may be modified such that its format is acceptable to the core processing function of the network node. This allows the network node to be configured and/or re-configured relatively quickly (using user-programmable MMFs) without requiring a more expensive and/or time-consuming update of the core processing function.

Signaling messages may be manipulated based on various pre-configured rules and/or conditions. For example, incoming signaling messages may be manipulated using an ingress MMF based on the contents of such messages and/or how such incoming signaling messages were received. Similarly, outgoing signaling messages may be manipulated using an egress MMF based on the contents of such messages and/or how such outgoing signaling messages are to be sent. However, the versatility of such message manipulation is limited.

It is desirable to provide improved methods for processing signaling messages in a network node. In particular, it is desirable to provide network nodes with more versatile and/or flexible message manipulation functionality.

BRIEF SUMMARY

According to a first aspect, there is provided a method of processing signaling messages in a network node in a telecommunications network, the network node comprising: a core processing part operable to perform a core processing function of the network node; an ingress processing part operable to: receive incoming signaling messages; and output signaling messages to the core processing part; an egress processing part operable to: receive outgoing signaling messages from the core processing part; and output signaling messages for transmission from the network node; and a message manipulation function configured to manipulate signaling messages according to one or more pre-defined message manipulation rules, wherein, in a first configuration of the network node, the message manipulation function is comprised in the ingress processing part, and in a second configuration of the network node, the message manipulation function is comprised in the egress processing part, the method comprising: in the first configuration, at the ingress processing part performing the following steps: determining an egress characteristic indicative of how an outgoing signaling message is to be outputted from the network node; and manipulating an incoming signaling message based on the determined egress characteristic; and in the second configuration, at the egress processing part performing the following steps: determining an ingress characteristic indicative of how an incoming signaling message has been received at the network node; and manipulating an outgoing signaling message based on the determined ingress characteristic.

According to a second aspect, there is provided an apparatus comprising at least one processor and at least one memory including computer program code, the at least one memory and the computer program code being configured to, with the at least one processor, cause the apparatus at least to perform a method for processing signaling messages in a network node in a telecommunications network, the network node comprising: a core processing part operable to perform a core processing function of the network node; an ingress processing part operable to: receive incoming signaling messages; and output signaling messages to the core processing part; an egress processing part operable to: receive outgoing signaling messages from the core processing part; and output signaling messages for transmission from the network node; and a message manipulation function configured to manipulate signaling messages according to one or more pre-defined message manipulation rules, wherein, in a first configuration of the network node the message manipulation function is comprised in the ingress processing part, and in a second configuration of the network node the message manipulation function is comprised in the egress processing part, the at least one memory and the computer program code being configured to, with the at least one processor, cause the apparatus to: in the first configuration, at the ingress processing part perform the following steps: determining an egress characteristic indicative of how an outgoing signaling message is to be outputted from the network node; and manipulating an incoming signaling message based on the determined egress characteristic; and in the second configuration, at the egress processing part perform the following steps: determining an ingress characteristic indicative of how an incoming signaling message has been received at the network node; and manipulating an outgoing signaling message based on the determined ingress characteristic.

According to a third aspect, there is provided a computer program product comprising a non-transitory computer-readable storage medium having computer-readable instructions stored thereon, the computer-readable instructions being executable by a computerized device to cause the computerized device to perform a method of processing signaling messages in a network node in a telecommunications network, the network node comprising: a core processing part operable to perform a core processing function of the network node; an ingress processing part operable to: receive incoming signaling messages; and output signaling messages to the core processing part; an egress processing part operable to: receive outgoing signaling messages from the core processing part; and output signaling messages for transmission from the network node; and a message manipulation function configured to manipulate signaling messages according to one or more pre-defined message manipulation rules, wherein, in a first configuration of the network node, the message manipulation function is comprised in the ingress processing part, and in a second configuration of the network node, the message manipulation function is comprised in the egress processing part, the method comprising: in the first configuration, at the ingress processing part performing the following steps: determining an egress characteristic indicative of how an outgoing signaling message is to be outputted from the network node; and manipulating an incoming signaling message based on the determined egress characteristic; and in the second configuration, at the egress processing part performing the following steps: determining an ingress characteristic indicative of how an incoming signaling message has been received at the network node; and manipulating an outgoing signaling message based on the determined ingress characteristic.

It should be appreciated that features described in relation to one aspect of the present disclosure may be incorporated into other aspects of the present disclosure. For example, a method aspect may incorporate any of the features described with reference to an apparatus aspect and vice versa.

BRIEF DESCRIPTION OF THE DRAWINGS

Embodiments of the present disclosure will now be described by way of example only with reference to the accompanying schematic drawings of which:

FIG. 1A shows a schematic view of an environment comprising a network node in a first configuration, according to embodiments of the present disclosure;

DETAILED DESCRIPTION

Figure 1B:
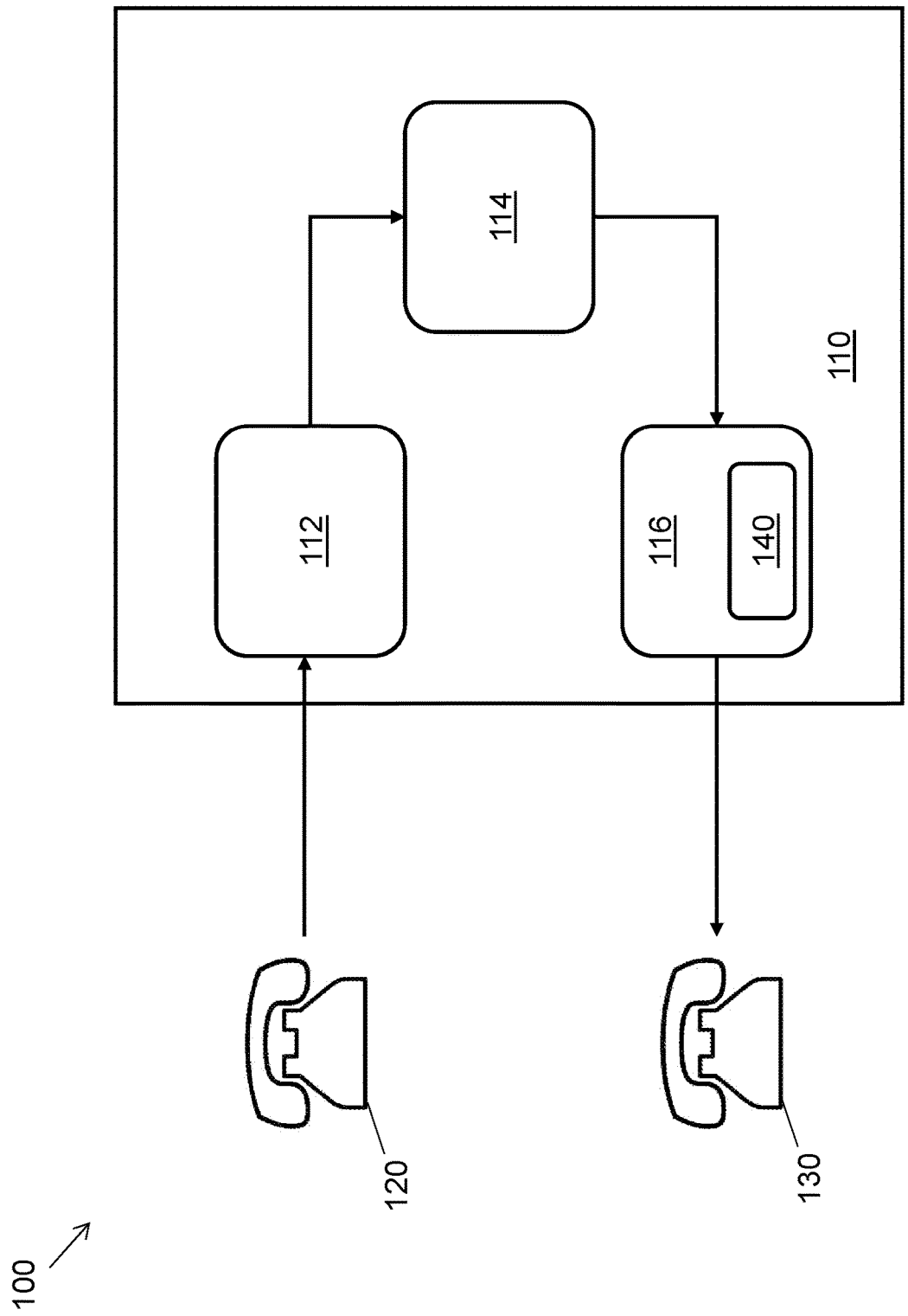
FIG. 1B shows a schematic view of the environment of FIG. 1A comprising the network node in a second configuration, according to embodiments of the present disclosure.

Referring to FIGS. 1A and 1B, there is shown an environment 100, according to embodiments. The environment 100 includes a network node 110. In embodiments, the network node 110 comprises an SBC. For example, the network node 110 may be deployed in the environment 100 to protect voice over internet protocol (VoIP) networks. The network node 110 comprises other types of node in alternative embodiments. For example, the network node 110 may comprise a media gateway or a core network node. At least part of the network node 110 may be configured to implement one or more of the methods described below.

The network node 110 comprises an ingress processing part 112, a core processing part 114 and an egress processing part 116.

The core processing part 114 is operable to perform a core processing function of the network node 110. The core processing function may be the principle function (or one of the principle functions) of the network node 110. In examples in which the network node 110 comprises an SBC, the core processing part 114 performs an SBC function. For example, the core processing function may relate to providing connectivity, control, data flow, security, quality of service, regulation, etc. between different parts of a communications network (e.g. a VoIP network).

The ingress processing part 112 is operable to receive messages such as incoming signaling messages. An incoming signaling message is a signaling message that is received at the network node 110 from another entity. In embodiments, the incoming signaling messages comprise SIP messages. In alternative embodiments, the incoming signaling messages comprise simple mail transfer protocol (SMTP) messages, or Diameter messages. Such incoming signaling messages may be received via a communications network (not shown). Such a network may be wired and/or wireless. In the embodiments shown in FIGS. 1A and 1B, the ingress processing part 112 is configured to receive incoming signaling messages from a first endpoint device 120. It will be understood that the ingress processing part 112 may receive incoming signaling messages from one or more intermediate nodes (i.e. not directly from the endpoint device 120) in some embodiments. The ingress processing part 112 is also operable to output signaling messages to the core processing part 114.

The egress processing part 116 is operable to receive messages such as outgoing signaling messages from the core processing part 114, and to output signaling messages for transmission from the network node 110. An outgoing signaling message is a signaling message that is to be outputted from the network node 110 (e.g. to another entity). In embodiments, the outgoing signaling messages comprise SIP messages. In alternative embodiments, the outgoing signaling messages comprise SMTP messages, or Diameter messages. The outgoing signaling messages may be of the same type (e.g. conform to the same signaling protocol) as the incoming signaling messages, or may be of a different type (e.g. conform to a different signaling protocol). Such outgoing signaling messages may be sent from the network node 110 via a communications network (not shown). In the embodiments shown in FIGS. 1A and 1B, the egress processing part 114 is configured to output signaling messages for transmission to a second endpoint device 130 (e.g. to set up a call between the endpoint devices 120, 130). It will be understood that the egress processing part 116 may send outgoing signaling messages to one or more intermediate nodes (i.e. not directly to the endpoint device 130) in some embodiments.

In embodiments, the ingress processing part 112 may also be able to function as the egress processing part 116, and vice-versa. Each of the ingress processing part 112, core processing part 114 and egress processing part 116 may be implemented using hardware and/or software. The ingress processing part 112, the core processing part 114 and/or the egress processing part 116 may be implemented as separate physical processors, or may be implemented by a single processor. That is, the ingress processing part 112, core processing part and/or egress processing part 116 may be logically distinct processing parts, rather than physically distinct processing parts, in some embodiments.

In embodiments, the ingress processing part 112 comprises one or more ingress, or incoming, interfaces (not shown), and/or the egress processing part 116 comprises one or more egress, or outgoing, interfaces (not shown). The ingress and/or egress interfaces may comprise physical interfaces. The ingress and/or egress interfaces may comprise wired and/or wireless interfaces. In embodiments, the ingress and/or egress interfaces comprise logical and/or functional interfaces. The ingress interfaces are for receiving incoming signaling messages (or other data), and the egress interfaces are for sending outgoing signaling messages (or other data). In alternative embodiments, the ingress processing part 112 does not comprise an ingress interface. For example, the ingress processing part 112 may be separate from an ingress interface of the network node 110, and may receive incoming messages from the ingress interface. Similarly, the egress processing part 116 may not comprise an egress interface in some embodiments. The egress processing part 116 may be separate from an egress interface of the network node 110, and may output outgoing messages to the egress interface.

The network node 110 comprises a message manipulation function (MMF) 140. The MMF 140 is configured to manipulate signaling messages according to one or more pre-defined message manipulation rules. In embodiments, at least one of the one or more message manipulation rules is user-defined. For example, the message manipulation rules may be user-programmable. As such, a user may program or re-program the MMF 140 when the network node 110 is first deployed or when the network node 110 is already operational. In other words, the MMF 140 may be used to configure and/or reconfigure the network node 110. The message manipulation rules may be received at the network node 110 via a user interface, according to some embodiments. The message manipulation rules define how signaling messages are to be processed. For example, whether a given signaling message is to be manipulated, and if so, how the given signaling message is to be manipulated (e.g. modified), may be defined by the message manipulation rules. The message manipulation rules may be stored at the network node 110 (e.g. at the ingress processing part 112 and/or the egress processing part 116), or may be stored remotely. In alternative embodiments, one or more message manipulation rules are conveyed on a per-message basis to the ingress processing part 112 and/or the egress processing part 116.

In embodiments, manipulating a signaling message using the MMF 140 comprises modifying a header and/or a body of the signaling message. For example, manipulating a signaling message may comprise modifying a SIP request line. Modifying a body of the signaling message may comprise modifying a session description protocol (SDP) data unit. Such an SDP data unit may specify a media format, codec and/or media communication protocol, and may be contained in the body of a SIP signaling message. In some embodiments, manipulating a signaling message comprises modifying one or more fields or sub-fields in the signaling message. Such fields may, for example, be comprised in a header and/or the body of the signaling message. Modification may include one or more of: adding data, deleting data, changing data, stripping a field, deleting a field, adding a new field, matching the contents of a field with a predetermined value or range of values, inserting new content into a field, replacing existing content of a field, etc. Using the MMF 140 allows signaling messages (or individual components thereof) to be examined, analyzed and/or modified in a flexible and programmable manner.

In the embodiments shown in FIG. 1A, the MMF 140 is comprised in the ingress processing part 112. As such, the MMF 140 is an ingress MMF in the embodiments shown in FIG. 1A. The MMF 140 may alternatively be comprised in the egress processing part 116. This is shown in FIG. 1B. The MMF 140 is an egress MMF in the embodiments shown in FIG. 1B. As such, in a first configuration of the network node 110 (shown in FIG. 1A), the MMF 140 is comprised in the ingress processing part 112, and in a second configuration of the network node 110 (shown in FIG. 1B), the MMF 140 is comprised in the egress processing part 116. In some embodiments, both the ingress processing part 112 and the egress processing part 116 comprise an MMF. Each of the ingress processing part 112 and the egress processing part 116 may comprise more than one MMF in some embodiments. The MMF 140 is not comprised in the core processing part 114. The MMF 140 is thus separate from the core processing function performed by the core processing part 114. In embodiments, the MMF 140 is not state-aware. As such, the MMF 140 may require relatively little processing and/or storage resources compared to the core processing function of the network node 110. The MMF 140 may be implemented using hardware and/or software.

Figure 2:
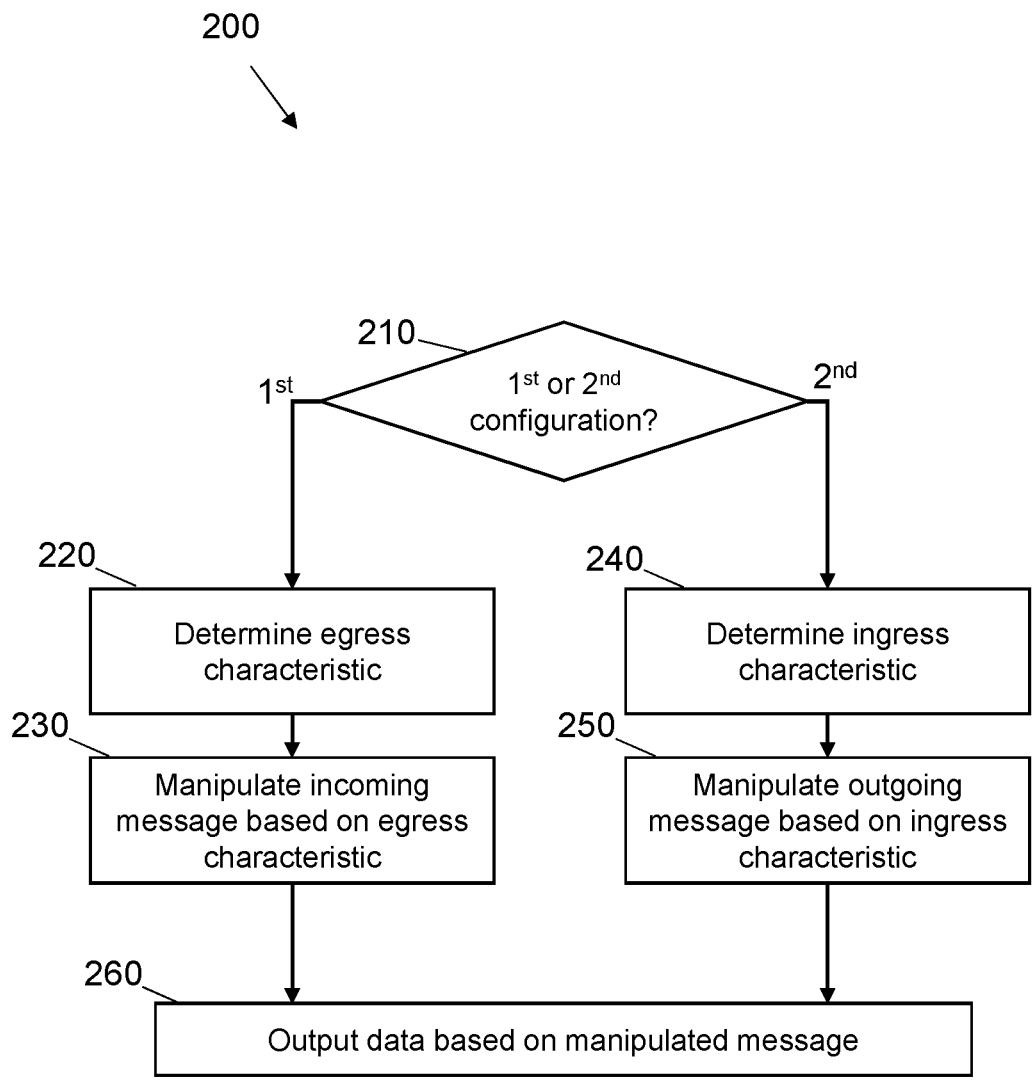
FIG. 2 shows a flow chart depicting a method of processing signaling messages in a network node according to embodiments of the present disclosure.

Referring to FIG. 2, there is shown a method 200 of processing signaling messages in a network node in a telecommunications network, according to embodiments. In embodiments, the method 200 is performed at least in part by the network node 110.

At item 210, it is determined whether the network node 110 is in a first configuration or a second configuration. In the first configuration of the network node 110, the MMF 140 is comprised in the ingress processing part 112. In the second configuration of the network node, the MMF 140 is comprised in the egress processing part 116. In alternative embodiments, the determination step of item 210 is not performed.

In the first configuration, an egress characteristic is determined at the ingress processing part 112 (item 220). The egress characteristic is indicative of how an outgoing signaling message is to be outputted from the network node 110. Examples of egress characteristics are provided below.

An incoming signaling message is manipulated at item 230 based on the determined egress characteristic. For example, the incoming signaling message may be manipulated if the determined egress characteristic corresponds to a predetermined egress characteristic (or range of egress characteristics), and may not be manipulated if the determined egress characteristic does not correspond to the predetermined egress characteristic (or range of egress characteristics). Alternatively, the incoming signaling message may be manipulated in a first manner if the determined egress characteristic corresponds to the predetermined egress characteristic, and may be manipulated in a second, different, manner if the determined egress characteristic does not correspond to the predetermined egress characteristic. Different incoming signaling messages may be manipulated differently based on different egress characteristics. The incoming signaling messages are manipulated according to the pre-defined message manipulation rules.

As such, an incoming signaling message is manipulated at the ingress processing part 112 based on how an outgoing signaling message is to be sent (from the egress processing part 116). The incoming signaling message is manipulated using the MMF 140 which, in the first configuration, is comprised in the ingress processing part 112. This may be referred to as a "far-side" ingress MMF. This is in contrast with a "near-side" ingress MMF, in which an incoming signaling message is manipulated based on how that incoming signaling message was received.

In embodiments, in the first configuration, the egress characteristic is comprised in the incoming signaling message. That is, the egress characteristic may be comprised in the message that is to be manipulated. This uses less signaling and/or data (and thus is more efficient) than a case in which the egress characteristic is conveyed separately to the incoming signaling message. In some examples, the egress characteristic is comprised in a header of the incoming signaling message.

In embodiments, in the first configuration, the egress characteristic is determined based on a signaling message that was received at the network node 110 prior to the incoming signaling message. For example, the egress characteristic may be determined based on an earlier signaling message in a telecommunications session that also involves the incoming signaling message. In embodiments, the earlier signaling message is an outgoing signaling message. In alternative embodiments, the earlier signaling message is an incoming signaling message. In embodiments, the egress characteristic is comprised in (and/or conveyed with) a first signaling message in a session, and is then stored. For subsequent signaling messages in the session, the stored egress characteristic may be retrieved. This may be more efficient than a case in which the egress characteristic is comprised in (and/or conveyed with) every signaling message in a session.

In embodiments, in the first configuration, the manipulating the incoming signaling message is further based on an ingress characteristic indicative of how the incoming signaling message was received at the network node 110. That is, whether or not the incoming signaling message is to be manipulated, and/or how the incoming signaling message is to be manipulated, may be based on both how that incoming signaling message was received, and how an outgoing signaling message is to be outputted. For example, message manipulation may be performed on incoming messages if they are received on a predetermined port. This provides greater flexibility in applying message manipulation rules. In alternative embodiments, the manipulating the incoming signaling message is performed independently of an ingress characteristic indicative of how the incoming signaling message was received at the network node 110. For example, if the ingress characteristic comprises an incoming port, message manipulation may be performed for incoming messages received on all incoming ports. Alternatively, message manipulation may be performed on incoming messages received on a subset of incoming ports.

In embodiments, in the first configuration, the outgoing signaling message is generated by the core processing part 114 based on the manipulated incoming signaling message. That is, the outgoing signaling message associated with the egress characteristic may be generated based on the manipulated incoming signaling message (the manipulated incoming signaling message having been manipulated based on the egress characteristic). In alternative embodiments, the outgoing signaling message associated with the egress characteristic is not generated based on the manipulated incoming signaling message. For example, the outgoing signaling message may have been generated prior to the incoming signaling message having been received at the network node 110.

In the second configuration of the network node 110, an ingress characteristic is determined at the egress processing part 116 (item 240). The ingress characteristic is indicative of how an incoming signaling message has been received at the network node 110.

An outgoing signaling message is manipulated at item 250 based on the determined ingress characteristic. For example, the outgoing signaling message may be manipulated if the determined ingress characteristic corresponds to a predetermined ingress characteristic (or range of ingress characteristics), and may not be manipulated if the determined ingress characteristic does not correspond to the predetermined ingress characteristic (or range of ingress characteristics). Alternatively, the outgoing signaling message may be manipulated in a first manner if the determined ingress characteristic corresponds to the predetermined ingress characteristic, and may be manipulated in a second, different, manner if the determined ingress characteristic does not correspond to the predetermined ingress characteristic. Different outgoing signaling messages may be manipulated differently based on different ingress characteristics. The outgoing signaling messages are manipulated according to the pre-defined message manipulation rules.

As such, an outgoing signaling message is manipulated at the egress processing part 116 based on how an incoming signaling message was received (at the ingress processing part 112). The outgoing signaling message is manipulated using the MMF 140 which, in the second configuration, is comprised in the egress processing part 116. This may be referred to as a "far-side" egress MMF. This is in contrast with a "near-side" egress MMF, in which an outgoing signaling message is manipulated based on how that outgoing signaling message is to be sent.

By enabling incoming message manipulation to be based on egress characteristics, and outgoing message manipulation to be based on ingress characteristics, greater flexibility and/or versatility is provided compared to a case in which incoming message manipulation is based only on ingress characteristics and outgoing message manipulation is based only on egress characteristics. For example, a greater variety of message manipulation rules (including relatively complex rules) may be implemented. By providing greater flexibility in how and when message manipulation rules may be applied, a greater number of potential interoperability problems and/or other issues can be addressed than would otherwise be the case, without having to update the core processing function of the network node. This also allows message manipulation functions to be deployed across a wider range of use cases.

In embodiments, the ingress characteristic and/or the egress characteristic relates to a telecommunications session. The incoming signaling message and/or the outgoing signaling message may be part of that telecommunications session (e.g. involved in the setup of the telecommunications session). In embodiments, the ingress characteristic and/or the egress characteristic relates to one or more of (or any combination of) a local port, a remote port, a local network address, a remote network address, a transaction, a customer, a transport type, a range of network addresses, a range of ports, a signaling protocol, a remote network node, and a cluster of network nodes. In some embodiments, the ingress characteristic and/or the egress characteristic relates to at least one logically adjacent node (i.e. a node that is directly connected to the network node 110). The ingress characteristic and/or the egress characteristic may identify the logically adjacent node, for example by identifying a network address of the logically adjacent node. In the first configuration, the outgoing message associated with the egress characteristic may be sent (or intended to be sent) to that logically adjacent node. In the second configuration, the incoming message associated with the ingress characteristic may have been sent from the logically adjacent node. The MMF 140 enables the network node 110 to interoperate more effectively and/or reliably with the logically adjacent node. Different logically adjacent nodes (e.g. associated with different communication sessions) may correspond to different ingress and/or egress characteristics.

In embodiments, in the second configuration, the ingress characteristic is comprised in the outgoing signaling message. That is, the ingress characteristic may be comprised in the signaling message that is to be manipulated. This uses less signaling and/or data (and thus is more efficient) than a case in which the ingress characteristic is conveyed separately to the outgoing signaling message. In embodiments, the ingress characteristic is comprised in a header of the outgoing signaling message. In some embodiments, the ingress characteristic is comprised in the incoming signaling message. In some embodiments, the ingress characteristic is determined based on a signaling message that was received and/or generated at the network node 110 prior to the outgoing signaling message. In embodiments, the earlier signaling message is an incoming signaling message. In alternative embodiments, the earlier signaling message is an outgoing signaling message.

In embodiments, a signaling message to be manipulated comprises signaling data and additional data. An ingress characteristic and/or an egress characteristic may be comprised in the additional data. As such, the ingress characteristic and/or the egress characteristic may, in some embodiments, not be comprised in the signaling data of the signaling message (e.g. the SIP signaling data, for SIP messages, which may comprise an SDP data unit). The additional data may be processed and/or transported along with the signaling data. For example, a signaling message, including the signaling data and the additional data, may be passed through the network node 110 (from the ingress processing part 112 to the egress processing part 116 via the core processing part 114). Such additional data may be transparent to the core processing part 114. The additional data may be referred to as "extrinsic message data", as opposed to the signaling data which may be referred to as "intrinsic message data". In alternative embodiments, the ingress characteristic and/or the egress characteristic is comprised in the signaling data.

In embodiments, manipulating signaling messages is based on message content. That is, in the first configuration, manipulating the incoming signaling message may be based on message content of the incoming signaling message. Additionally or alternatively, in the second configuration, manipulating the outgoing signaling message may be based on message content of the outgoing signaling message. Therefore, an incoming signaling message may be manipulated based on both the egress characteristic of an outgoing signaling message and the message content of the incoming signaling message, and/or an outgoing signaling message may be manipulated based on both the ingress characteristic of an incoming signaling message and the message content of the outgoing signaling message. For example, manipulation may be performed for some types of incoming and/or outgoing message and not for other types of incoming and/or outgoing message. The message content of a given signaling message may comprise one or more of the content of a message header, the content of a request line, and the content of a message body (or payload).

In alternative embodiments, the message content is not taken into account. That is, manipulation could apply to every incoming and/or outgoing message (regardless of content). For example, if it is determined that the egress characteristic and/or ingress characteristic is associated with an emergency service, every incoming message and/or outgoing message may be manipulated regardless of the message content. In some cases, every message is manipulated in the same manner regardless of the message content. In other cases, manipulation is performed regardless of the message content, but how such messages are manipulated (e.g. modified) depends on the message content.

In embodiments, manipulating a given signaling message comprises modifying a header of the signaling message. As such, in the first configuration, manipulating the incoming signaling message may comprise modifying a header of the incoming signaling message, and in the second configuration, manipulating the outgoing signaling message may comprise modifying a header of the outgoing signaling message.

In embodiments, manipulating a given signaling message comprises modifying a body of the signaling message. As such, in the first configuration, the manipulating the incoming signaling message may comprise modifying a body of the incoming signaling message, and in the second configuration, manipulating the outgoing signaling message may comprise modifying a body of the outgoing signaling message.

In embodiments, in the second configuration, the manipulating the outgoing signaling message is further based on an egress characteristic indicative of how the outgoing signaling message it to be outputted from the network node 110. That is, whether or not the outgoing signaling message is to be manipulated, and/or how the outgoing signaling message is to be manipulated, may be based on both how that outgoing signaling message is to be outputted, and how an incoming signaling message was received. For example, message manipulation may be performed on outgoing messages if they are to be outputted via a predetermined port. This provides greater flexibility in applying message manipulation rules. In alternative embodiments, manipulating the outgoing signaling message is performed independently of an egress characteristic indicative of how the outgoing signaling message is to be outputted from the network node 110. For example, if the egress characteristic comprises an outgoing port, message manipulation may be performed for outgoing messages across all outgoing ports. Alternatively, message manipulation may be performed on outgoing messages across a subset of outgoing ports.

In embodiments, in the second configuration, the outgoing signaling message is generated by the core processing part 114 based on the incoming signaling message. That is, the outgoing signaling message to be manipulated may be generated based on the incoming signaling message associated with the ingress characteristic. In alternative embodiments, the outgoing signaling message is not generated based on the incoming signaling message associated with the ingress characteristic. The outgoing signaling message may be generated based on a different incoming signaling message, for example.

In embodiments, the ingress characteristic is different from the egress characteristic. In alternative embodiments, the ingress characteristic is the same as the egress characteristic. For example, a given incoming signaling message may be received, and a given outgoing signaling message may be sent, via the same port. The incoming port is an example of an ingress characteristic, and the outgoing port is an example of an egress characteristic. In some examples, a request (e.g. a SIP request) may be received with a given ingress characteristic, and the response to that request may be sent with an egress characteristic that is the same as the ingress characteristic.

In embodiments, one of the ingress characteristic and the egress characteristic is determined using the other of the ingress characteristic and the egress characteristic. For example, it may be known that the ingress characteristic for a given incoming signaling message will be the same as the egress characteristic for a given outgoing signaling message, and that egress characteristic may be known. Therefore, the ingress characteristic may be determined on the basis of the egress characteristic. This may be the case for future incoming signaling messages, for example (that is, incoming signaling messages which have not yet been received at a time at which a given outgoing signaling message is to be sent). As such, the egress processing part 116 can deduce the relevant ingress characteristic even for incoming signaling messages which have not yet been received at the network node 110. Similarly, the ingress processing part 112 may deduce the egress characteristic for an outgoing signaling message which has not yet been outputted at a time at which a given incoming signaling message is received at the network node 110.

At item 260, data is outputted from the network node based on the manipulated signaling message. The data may comprise the manipulated signaling message, or other data derived therefrom. In some embodiments, for example where the MMF 140 is comprised in the egress processing part 116, the outputted data comprises (and/or is derived based on) the manipulated outgoing signaling message. In some embodiments, for example where the MMF 140 is comprised in the ingress processing part 112, the outputted data comprises (and/or is derived based on) an outgoing signaling message generated on the basis of the manipulated incoming signaling message. Such an outgoing signaling message may be generated by the core processing part 114 in response to the core processing part 114 receiving the manipulated incoming signaling message from the ingress processing part 112. In alternative embodiments, the outputting step of item 260 is not performed.

In embodiments, the network node 110 comprises a first further MMF. The first further MMF is configured to manipulate signaling messages according to one or more pre-defined message manipulation rules. In the first configuration of the network node 110 (i.e. when the MMF 140 is comprised in the ingress processing part 112), the first further MMF is comprised in the egress processing part 116. In the second configuration (i.e. when the MMF 140 is comprised in the egress processing part 116), the first further MMF is comprised in the ingress processing part 112. As such, in some embodiments, both the ingress processing part 112 and the egress processing part 116 comprise an MMF. Configuring both processing parts 112, 116 with an MMF provides greater versatility and/or flexibility, and allows for a greater variety of manipulation rules to be implemented, compared to a case in which only one of the processing parts 112, 116 comprises an MMF.

In embodiments, in the first configuration, the method 200 comprises, at the egress processing part 116, determining an ingress characteristic indicative of how an incoming signaling message has been received at the network node 110, and manipulating, using the first further MMF, an outgoing signaling message based on the determined ingress characteristic. In such embodiments, in the second configuration, the method 200 comprises, at the ingress processing part 116, determining an egress characteristic indicative of how an outgoing signaling message is to be outputted from the network node 110, and manipulating, using the first further MMF, an incoming signaling message based on the determined egress characteristic. As such, the ingress processing part 112 comprises an MMF that manipulates incoming signaling messages based on an egress characteristic, and the egress processing part 116 comprises an MMF that manipulates outgoing signaling messages based on an ingress characteristic. In other words, both the ingress processing part 112 and the egress processing part 116 comprise far-side MMFs. This increases the flexibility and/or versatility of the processing parts 112, 116 (and thus of the network node 110 overall) compared to a case in which one of the processing parts 112, 116 does not comprise a far-side MMF. In alternative embodiments, one or the other of the ingress processing part 112 and the egress processing part 116 does not comprise a far-side MMF.

In embodiments, the network node 110 comprises a second further MMF. The second further MMF is configured to manipulate signaling messages according to one or more pre-defined message manipulation rules. The second further MMF may be comprised in the ingress processing part 112 or the egress processing part 116. The terms "first" and "second" as used herein are merely labels, and do not imply a particular order, nor that both such items are required in any embodiment. For example, the second further MMF may be included in the network node 110 without the first further MMF as described above, and vice-versa.

In embodiments (for example where the second further MMF is comprised in the ingress processing part 112), the method 200 comprises manipulating, using the second further MMF, an incoming signaling message based on an ingress characteristic indicative of how the incoming signaling message has been received at the network node 110. In alternative embodiments (for example where the second further MMF is comprised in the egress processing part 116), the method 200 comprises manipulating, using the second further MMF, an outgoing signaling message based on an egress characteristic indicative of how the outgoing signaling message is to be outputted from the network node 110. Therefore, the second further MMF may be considered to be a "near-side" MMF, in contrast with the MMF 140 and, in some embodiments, the first further MMF. Such a near-side MMF may be used in combination with the MMF 140 and, optionally, the first further MMF. Therefore, both far-side and near-side MMFs may be used by the network node 110, in the same processing part or different processing parts. This provides greater flexibility and/or versatility in message manipulation (e.g. a greater variety of use-cases, conditions and rules may be implemented) compared to a case in which both far-side and near-side MMFs are not used.

In embodiments, in the first configuration and/or the second configuration, the incoming signaling message and/or the outgoing signaling message conforms to a session-based protocol. In some such embodiments, the session-based protocol comprises one or more of SIP, SMTP, and Diameter.

In embodiments, the method 200 comprises receiving one or more incoming signaling messages at the network node 110 (i.e. at the ingress processing part 112).

In embodiments, the ingress characteristic and/or the egress characteristic stays constant throughout a telecommunications session. For example, all incoming signaling messages for a given session may be received on the same incoming port. In alternative embodiments, the ingress characteristic and/or the egress characteristic varies over the session.

In embodiments, in the first configuration, the manipulating the incoming signaling message affects processing performed by the core processing part 114. For example, the processing of a signaling message by the core processing part 114 may be performed differently depending on whether and/or how manipulation of the incoming signaling message was performed at the ingress processing part 112. In some cases, the manipulating the incoming signaling message affects processing performed by a further network node. The further network node may be a downstream network node (e.g. a network node that receives signaling messages outputted by the network node 110).

In embodiments, in the second configuration, the manipulating the outgoing signaling message affects processing performed by the further network node. That is, the further network node may receive the outgoing signaling message outputted from the network node 110. The processing of such a signaling message (and/or other signaling messages) by the further network node may be performed differently depending on whether and/or how manipulation of the outgoing signaling message was performed at the egress processing part 116.

Figure 3:
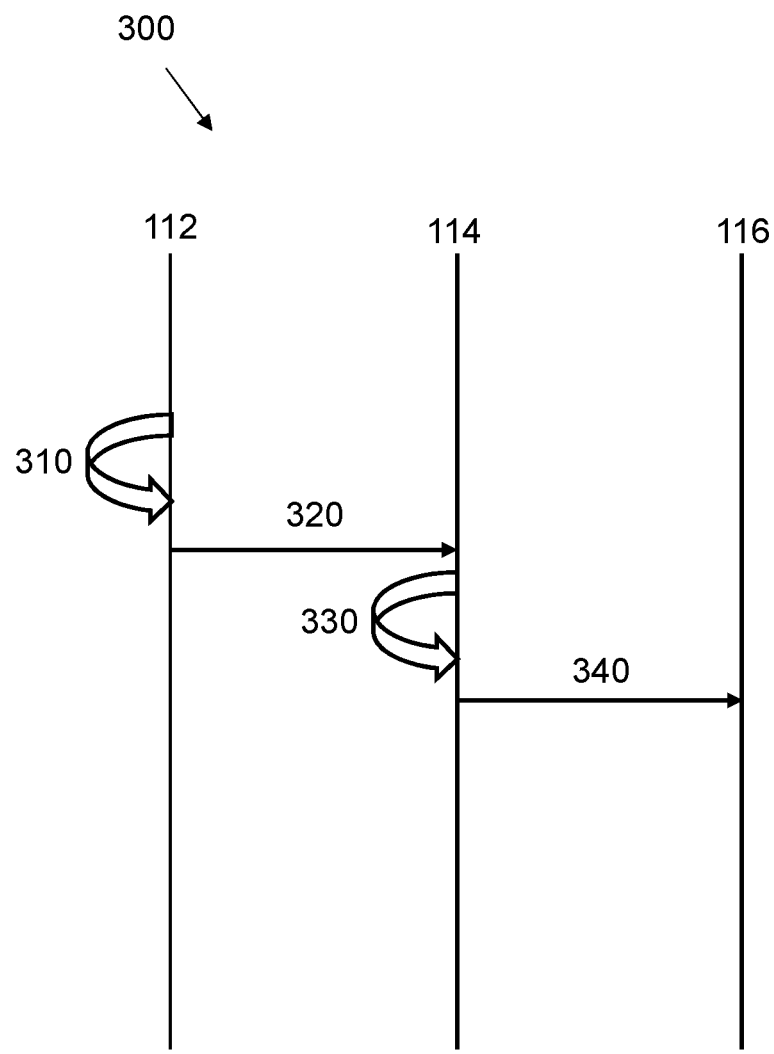
FIG. 3 shows a sequence diagram representing an example of a method according to embodiments of the present disclosure.

Referring to FIG. 3, there is shown a method 300 of processing signaling messages, according to embodiments. In the embodiments shown in FIG. 3, the method 300 is performed in the network node 110 described with reference to FIGS. 1A and 1B. In the embodiments of FIG. 3, the network node 110 is in the first configuration. As such, the ingress processing part 112 of the network node 110 comprises the MMF 140 in such embodiments.

At item 310, the ingress processing part 112 manipulates an incoming signaling message. The incoming signaling message may be received at the ingress processing part 112 from another entity, for example. The incoming signaling message is manipulated using the MMF 140. The incoming signaling message is manipulated based on a determined egress characteristic. The egress characteristic is indicative of how an outgoing signaling message is to be outputted from the network node 110. The egress characteristic may be determined at the ingress processing part 112. As such, in the embodiments of FIG. 3, the network node 110 comprises a far-side ingress MMF.

At item 320, the ingress processing part 112 sends a manipulated signaling message to the core processing part 114. The manipulated signaling message may be considered to be a manipulated version (or a post-MMF version) of the incoming signaling message.

At item 330, the core processing part 114 performs a core processing function on the manipulated signaling message.

At item 340, the core processing part 114 sends an outgoing signaling message to the egress processing part 116. The outgoing signaling message is generated based on the manipulated incoming signaling message. The outgoing signaling message is for outputting from the network node 110 (e.g. for transmission to a further entity).

Figure 4:
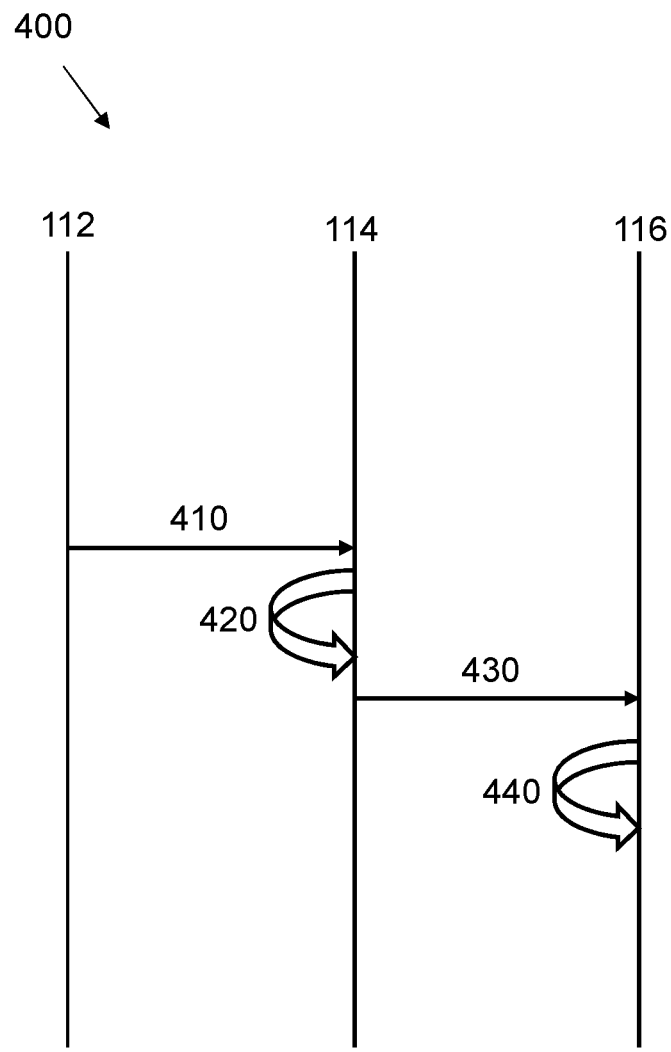
FIG. 4 shows a sequence diagram representing another example of a method according to embodiments of the present disclosure.

Referring to FIG. 4, there is shown a method 400 of processing signaling messages, according to embodiments. In the embodiments shown in FIG. 4, the method 400 is performed in the network node 110 described with reference to FIGS. 1A and 1B. In the embodiments of FIG. 4, the network node 110 is in the second configuration. As such, the egress processing part 116 of the network node 110 comprises the MMF 140 in such embodiments.

At item 410, the ingress processing part 112 sends an incoming signaling message to the core processing part 114. The incoming signaling message may be received at the ingress processing part 112 from another entity, for example.

At item 420, the core processing part 114 performs a core processing function on the signaling message.

At item 430, the core processing part 114 sends an outgoing signaling message to the egress processing part 116. The outgoing signaling message is generated based on the incoming signaling message. The outgoing signaling message is for outputting from the network node 110 (e.g. for transmission to a further entity).

At item 440, the egress processing part 116 manipulates the outgoing signaling message. The outgoing signaling message is manipulated using the MMF 140. The outgoing signaling message is manipulated based on a determined ingress characteristic. The ingress characteristic is indicative of how an incoming signaling message has been received at network node 110. The incoming signaling message relating to the ingress characteristic may be the same as the incoming signaling message sent by the ingress processing part at item 410, or may be a different incoming signaling message. The ingress characteristic may be determined at the egress processing part 116. As such, in the embodiments of FIG. 4, the network node 110 comprises a far-side egress MMF.

The manipulated (or post-MMF) outgoing signaling message may be outputted, e.g. for transmission from the network node 110.

Figure 5:
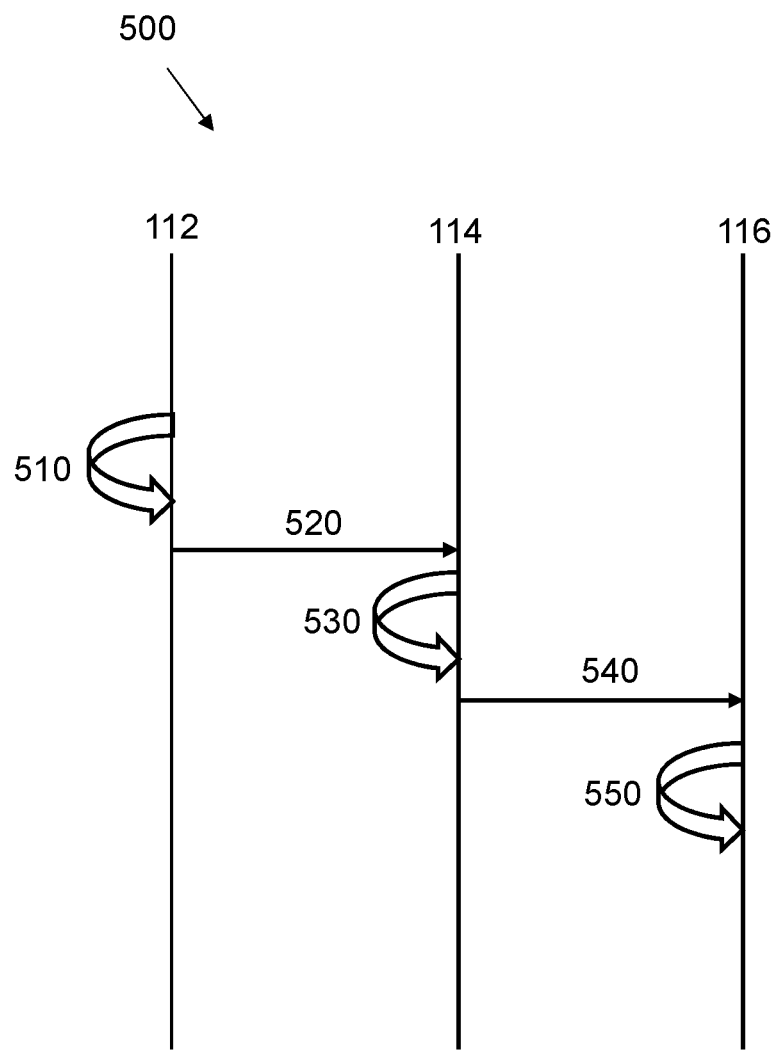
FIG. 5 shows a sequence diagram representing another example of a method according to embodiments of the present disclosure.

Referring to FIG. 5, there is shown a method 500 of processing signaling messages, according to embodiments. In the embodiments shown in FIG. 5, the method 500 is performed in the network node 110 described with reference to FIGS. 1A and 1B. In the embodiments of FIG. 5, both the ingress processing part 112 and the egress processing part 116 of the network node 110 comprise an MMF.

At item 510, the ingress processing part 112 manipulates an incoming signaling message. The incoming signaling message is manipulated using the MMF comprised in the ingress processing part 112. The incoming signaling message is manipulated based on a determined egress characteristic. The egress characteristic is indicative of how an outgoing signaling message is to be outputted from the network node 110.

At item 520, the ingress processing part 112 sends a manipulated incoming signaling message to the core processing part 114. The manipulated incoming signaling message may be considered to be a manipulated version of the incoming signaling message.

At item 530, the core processing part 114 performs a core processing function on the manipulated incoming signaling message. In embodiments, the manipulating of the incoming signaling message at the ingress processing part 112 affects how the core processing part 114 processes the signaling message. In some cases, the manipulating of the incoming signaling message at the ingress processing part 112 affects how a further network node (e.g. a downstream network node) processes a signaling message.

At item 540, the core processing part 114 sends an outgoing signaling message to the egress processing part 116. The outgoing signaling message is generated based on the manipulated incoming signaling message. The outgoing signaling message is for outputting from the network node 110.

At item 550, the egress processing part 116 manipulates the outgoing signaling message. The outgoing signaling message is manipulated using the MMF comprised in the egress processing part 116. The outgoing signaling message is manipulated based on a determined ingress characteristic. The ingress characteristic is indicative of how an incoming signaling message has been received at network node 110. In embodiments, the manipulating of the outgoing signaling message at the egress processing part 116 affects how a further network node (e.g. a downstream network node) processes a signaling message (e.g. the outgoing signaling message when received at the further network node).

As such, in the embodiments of FIG. 5, the network node 110 comprises a far-side ingress MMF and a far-side egress MMF.

The manipulated outgoing signaling message may be outputted, e.g. for transmission from the network node 110.

Figure 6:
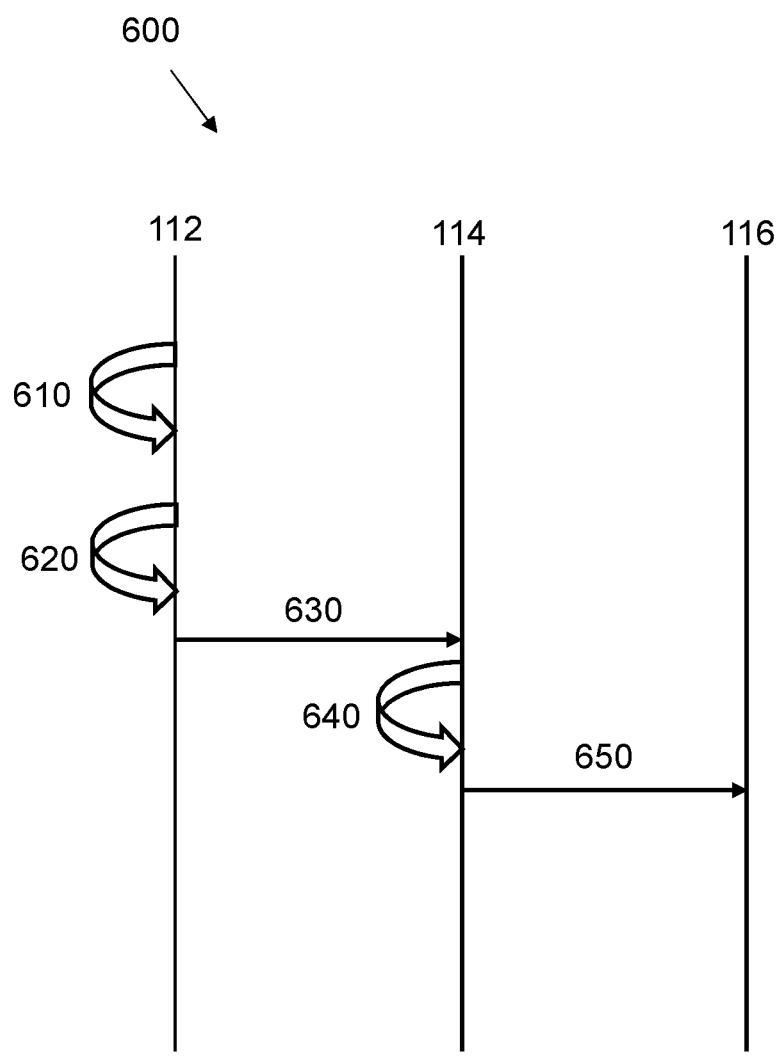
FIG. 6 shows a sequence diagram representing another example of a method according to embodiments of the present disclosure.

Referring to FIG. 6, there is shown a method 600 of processing signaling messages, according to embodiments. In the embodiments shown in FIG. 6, the method 600 is performed in the network node 110 described with reference to FIGS. 1A and 1B. In the embodiments of FIG. 6, the ingress processing part 112 comprises the MMF 140 and a further MMF.

At item 610, the ingress processing part 112 manipulates an incoming signaling message. The incoming signaling message is manipulated using the MMF 140. The incoming signaling message is manipulated based on a determined egress characteristic. The egress characteristic is indicative of how an outgoing signaling message is to be outputted from the network node 110.

At item 620, the ingress processing part 112 further manipulates the incoming signaling message using the further MMF. The incoming signaling message is further manipulated based on an ingress characteristic. The ingress characteristic is indicative of how the incoming signaling message has been received at the network node 110.

As such, in the embodiments shown in FIG. 6, the incoming signaling message is first manipulated using the MMF 140 (based on an egress characteristic), and further manipulated using the further MMF (based on an ingress characteristic). The order of the manipulation steps 610, 620 may be reversed in alternative embodiments. Therefore, in the embodiments of FIG. 6, the network node 110 comprises a far-side ingress MMF (namely the MMF 140) and a near-side ingress MMF (namely the further MMF).

At item 630, the ingress processing part 112 sends a manipulated signaling message to the core processing part 114.

At item 640, the core processing part 114 performs a core processing function on the manipulated signaling message.

At item 650, the core processing part 114 sends an outgoing signaling message to the egress processing part 116. The outgoing signaling message is generated based on the manipulated incoming signaling message. The outgoing signaling message is for outputting from the network node 110.

Figure 7:
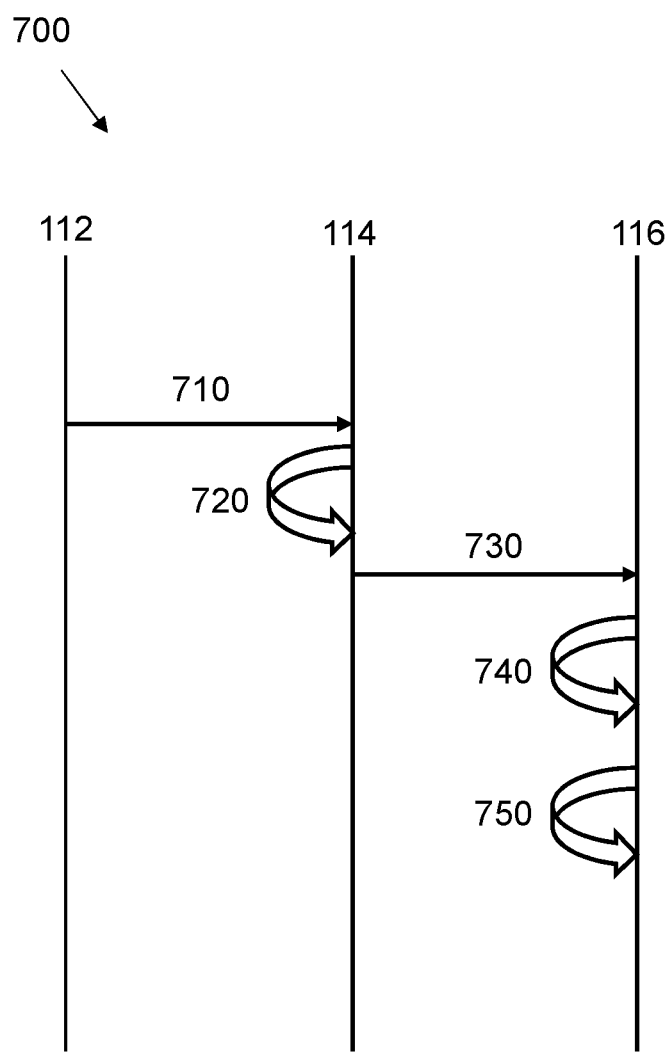
FIG. 7 shows a sequence diagram representing another example of a method according to embodiments of the present disclosure.

Referring to FIG. 7, there is shown a method 700 of processing signaling messages, according to embodiments. In the embodiments shown in FIG. 7, the method 700 is performed in the network node 110 described with reference to FIGS. 1A and 1B. In the embodiments of FIG. 7, the egress processing part 116 comprises the MMF 140 and a further MMF.

At item 710, the ingress processing part 112 sends an incoming signaling message to the core processing part 114.

At item 720, the core processing part 114 performs a core processing function on the signaling message.

At item 730, the core processing part 114 sends an outgoing signaling message to the egress processing part 116. The outgoing signaling message is generated based on the incoming signaling message. The outgoing signaling message is for outputting from the network node 110.

At item 740, the egress processing part 116 manipulates the outgoing signaling message. The outgoing signaling message is manipulated using the MMF 140. The outgoing signaling message is manipulated based on a determined ingress characteristic. The ingress characteristic is indicative of how an incoming signaling message has been received at network node 110. The incoming signaling message relating to the ingress characteristic may be the same as the incoming signaling message sent by the ingress processing part at item 410, or may be a different incoming signaling message.

At item 750, the egress processing part 116 further manipulates the outgoing signaling message using the further MMF. The outgoing signaling message is further manipulated based on an egress characteristic. The egress characteristic is indicative of how the outgoing signaling message is to be outputted from the network node 110.

As such, in the embodiments of FIG. 7, the outgoing signaling message is first manipulated using the MMF 140 (based on an ingress characteristic), and further manipulated using the further MMF (based on an egress characteristic). The order of the manipulation steps 740, 750 may be reversed in alternative embodiments. Therefore, in the embodiments of FIG. 7, the network node 110 comprises a far-side egress MMF (namely the MMF 140) and a near-side egress MMF (namely the further MMF).

Both the ingress processing part 112 and the egress processing part 116 may comprise one or more far-side and/or near-side MMFs in alternative embodiments.

At least part of any one of the methods 200, 300, 400, 500, 600, 700 may be performed in combination with and/or in addition at least part of any other of the methods 200, 300, 400, 500, 600, 700.

In embodiments, the network node 110 comprises both ingress and egress MMFs, but only one of the ingress characteristic and egress characteristic may be required and/or determined. For example, a near-side ingress MMF may be used in conjunction with a far-side egress MMF. Both of these MMFs may manipulate messages based on ingress characteristics of incoming messages, although one MMF operates on incoming messages and the other MMF operates on outgoing messages. In such an example, the egress characteristics of outgoing messages may not be required and/or known.

Figure 8:
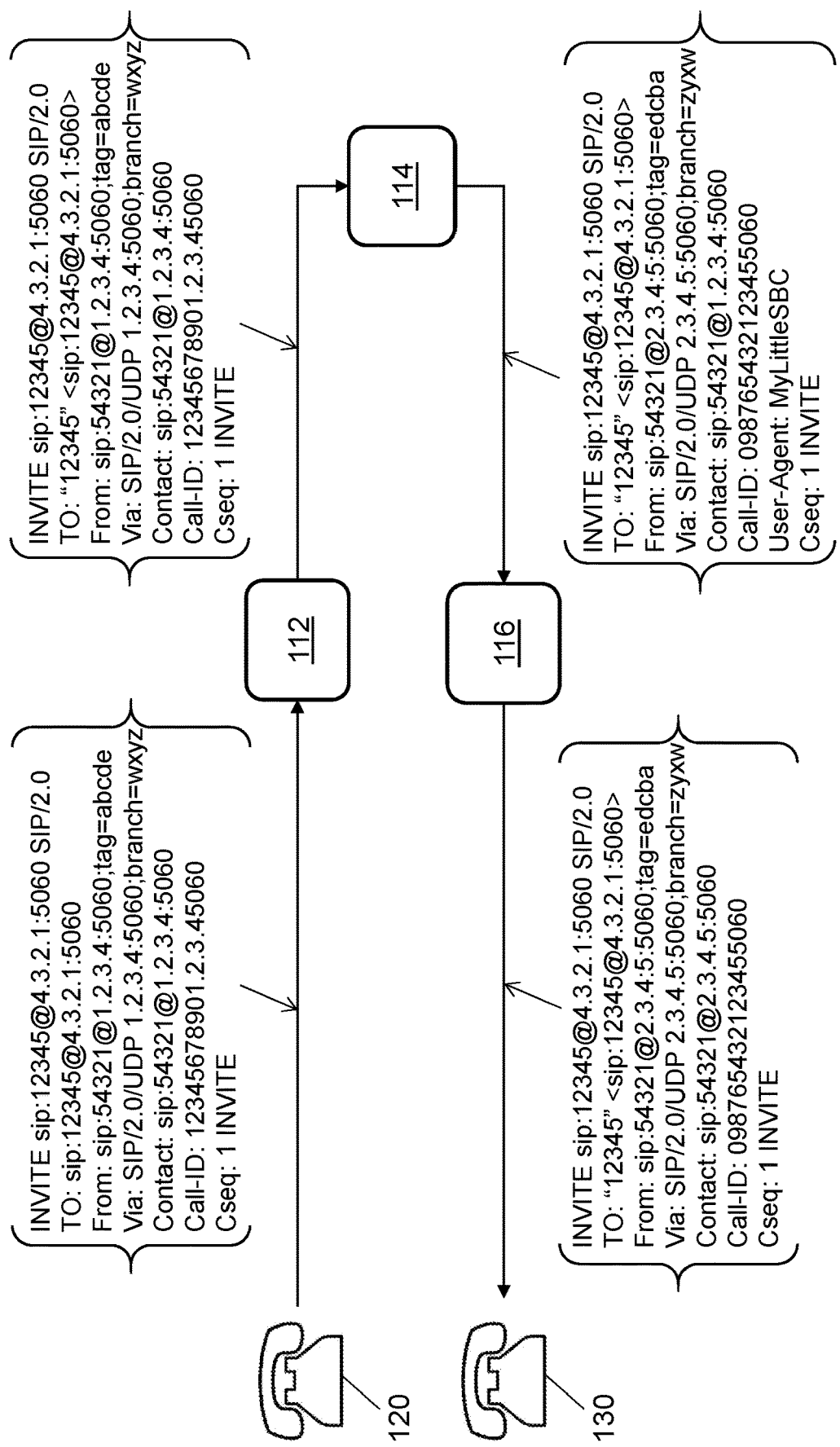
FIG. 8 shows an example of message manipulation according to embodiments of the present disclosure.

Referring to FIG. 8, there is shown an example of message manipulation in a network node using the above-described methods. In this example, the ingress processing part 112 comprises a near-side MMF (not shown), and the egress processing part 116 comprises a far-side MMF (not shown). The signaling messages in this example are SIP messages, and the network node 110 in this example is an SBC. The near-side ingress MMF is configured to change a "To" header field of an incoming signaling message. Since the ingress MMF is near-side, the modification of the header field is based on how the incoming signaling message was received (i.e. an ingress characteristic). The core processing part 114 receives the manipulated signaling message, and generates an outgoing signaling message. In embodiments, the outgoing signaling message differs from the manipulated incoming signaling message. In this example, the core processing part 114 changes the "From" and "Via" header fields, and adds a "User-Agent" field. The far-side egress MMF is configured to strip the "User-Agent" header field of the outgoing signaling message. Since the egress MMF is far-side, the modification of the header field is based on how the incoming signaling message was received (i.e. an ingress characteristic), rather than how the outgoing signaling message is to be outputted. A near-side MMF may manipulate a message in one manner, and a far-side MMF may manipulate the same message in another manner (or not at all), or vice-versa. Therefore, the resulting post-MMF message may be different depending on whether or not a near-side or a far-side MMF is used.

Another example of a message manipulation rule is: if a message was received from internet protocol (IP) address 1.2.3.4 and an 'Allow' header is present, strip the 'Allow' header on egress. This rule may be implemented with a far-side egress MMF, since it is to be actioned at egress (on an outgoing message), but is based on an ingress characteristic (the IP address the message was received from). This rule is also based on message content (i.e. it is only actioned for messages that include the 'Allow header).

Some message manipulation rules may only be implemented using a far-side MMF. For example, the following rule may be implemented using a far-side egress MMF but not a near-side MMF: for all SIP messages received on port 1, strip the User-Agent header just prior to sending. Similarly, the following rule may be implemented using a far-side ingress MMF: if a SIP request is received on port 1, the response to that request should have any "Silence Suppression" lines removed from the SDP as it is received. By providing both near-side and far-side types of MMF, a greater range of possible rules, actions and/or results may be obtained, thereby increasing the functionality and/or versatility of the network node 110.

Further, a signaling message as received by the core processing part 114 may be different depending on when an MMF is applied to the signaling message (i.e. at ingress or at egress). Therefore, the processing performed by the core processing part 114 may be different depending on how and when the MMF has been applied. This facilitates an increase in the functionality of the network node 110. The network node 110 may, for example, perform Rf and/or Rx lookups based on SIP header contents. Such lookups thus depend on the header of the message as received by the core processing part 114, and the contents of the header may vary depending on how and when the MMF has been applied.

The network node 110, ingress processing part 112, core processing part 114, egress processing part 116 and/or message manipulation function(s) as described above may be comprised in or implemented in apparatus comprising a processor or processing system. The processing system may comprise one or more processors and/or memory. Each device, module, component, machine or function as described in relation to any of the examples described herein, for example the ingress processing part 112, egress processing part 116 and message manipulation function(s), may similarly comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

In embodiments described above, the network node 110 has a first configuration, in which the MMF 140 is comprised in the ingress processing part 112, and a second configuration, in which the MMF 140 is comprised in the egress processing part 116. In alternative embodiments, the network node 110 has a single configuration, in which the MMF 140 is comprised in one of the ingress processing part 112 and the egress processing part 116. Other MMFs may be comprised in the other of the ingress processing part 112 and the egress processing part 116.

In embodiments described above, the message manipulation rules are user-defined. In alternative embodiments, at least one of the message manipulation rules used by the MMF 140 is machine-defined.

In embodiments described above, ingress and/or egress characteristics are passed through the network node 110 with the signaling messages (e.g. as part of the signaling data, or as additional data). This enables the egress processing part 116 to obtain the ingress characteristics of incoming messages, for example. In alternative embodiments, the ingress and/or egress characteristics are not passed through the network node 110 with the signaling messages. For example, ingress and/or egress characteristics may be conveyed directly between the ingress processing part 112 and the egress processing part 116, without going through the core processing part 114. In alternative embodiments, one or more header fields of a signaling message are added and/or modified to indicate the ingress and/or egress characteristic.

In embodiments described above, processing is performed on signaling messages. In alternative embodiments, messages other than signaling messages are processed (e.g. received, manipulated, generated, outputted, etc.). For example, user data (e.g. comprising voice, video or other media) may be processed in a similar manner to that described above. Such user data may be packet-based.

In embodiments described above, the signaling messages conform to a session-based protocol. In alternative embodiments, the signaling messages do not conform to a session-based protocol. The signaling messages may not be associated with a telecommunications session in some embodiments. For example, the signaling messages may be associated with a stateless communication (i.e. communication consisting of independent requests with responses).

In alternative embodiments, message manipulation may be performed to provide interoperability between different signaling protocols. For example, the input to an MMF may be a message conforming to a first protocol (e.g. SIP), and the output of the MMF may be a message conforming to a second protocol (e.g. Diameter).

Embodiments comprise measures, including methods, apparatus and computer program products, for use in processing signaling messages in a network node in a telecommunications network. The network node comprises a core processing part operable to perform a core processing function of the network node; an ingress processing part operable to receive incoming signaling messages and output signaling messages to the core processing part; and an egress processing part operable to receive outgoing signaling messages from the core processing part and output signaling messages for transmission from the network node. The network node comprises a message manipulation function configured to manipulate signaling messages according to one or more pre-defined message manipulation rules. The message manipulation function is comprised in one of the ingress processing part and the egress processing part. If the message manipulation function is comprised in the ingress processing part, an egress characteristic is determined, indicative of how an outgoing signaling message is to be outputted from the network node. An incoming signaling message is manipulated based on the determined egress characteristic. If the message manipulation function is comprised in the egress processing part, an ingress characteristic is determined, indicative of how an incoming signaling message has been received at the network node. An outgoing signaling message is manipulated based on the determined ingress characteristic.

Embodiments comprise measures, including methods, apparatus and computer program products, for use in processing signaling messages in a network node in a telecommunications network. The network node comprises a core processing part operable to perform a core processing function of the network node; an ingress processing part operable to: receive incoming signaling messages; and output signaling messages to the core processing part; an egress processing part operable to: receive outgoing signaling messages from the core processing part; and output signaling messages for transmission from the network node; and a message manipulation function configured to manipulate signaling messages according to one or more pre-defined message manipulation rules. The message manipulation function is comprised in the ingress processing part. The ingress processing part performs the following steps: determining an egress characteristic indicative of how an outgoing signaling message is to be outputted from the network node; and manipulating an incoming signaling message based on the determined egress characteristic.

Embodiments comprise measures, including methods, apparatus and computer program products, for use in processing signaling messages in a network node in a telecommunications network. The network node comprises a core processing part operable to perform a core processing function of the network node; an ingress processing part operable to: receive incoming signaling messages; and output signaling messages to the core processing part; an egress processing part operable to: receive outgoing signaling messages from the core processing part; and output signaling messages for transmission from the network node; and a message manipulation function configured to manipulate signaling messages according to one or more pre-defined message manipulation rules. The message manipulation function is comprised in the egress processing part. The egress processing part performs the following steps: determining an ingress characteristic indicative of how an incoming signaling message has been received at the network node; and manipulating an outgoing signaling message based on the determined ingress characteristic.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of processing signaling messages in a network node in a telecommunications network, the network node comprising:

a core processing part operable to perform a core processing function of the network node;

an ingress processing part operable to:
 receive incoming signaling messages; and
 output signaling messages to the core processing part;

an egress processing part operable to:
 receive outgoing signaling messages from the core processing part; and
 output signaling messages for transmission from the network node; and a message manipulation function configured to manipulate signaling messages according to one or more pre-defined message manipulation rules, wherein, in a first configuration of the network node, the message manipulation function is comprised in the ingress processing part, and in a second configuration of the network node, the message manipulation function is comprised in the egress processing part, the method comprising:
 in the first configuration, at the ingress processing part:
  determining an egress characteristic indicative of how an outgoing signaling message is to be outputted from the network node; and
  manipulating an incoming signaling message based on the determined egress characteristic; and
 in the second configuration, at the egress processing part:
  determining an ingress characteristic indicative of how an incoming signaling message has been received at the network node; and manipulating an outgoing signaling message based on the determined ingress characteristic.

2. The method according to claim 1, wherein, in the first configuration, the egress characteristic is comprised in the incoming signaling message.

3. The method according to claim 1, wherein, in the second configuration, the ingress characteristic is comprised in the outgoing signaling message.

4. The method according to claim 1, comprising, in the first configuration, determining the egress characteristic based on a signaling message that was received at the network node prior to the incoming signaling message.

5. The method according to claim 1, wherein:
in the first configuration, the manipulating the incoming signaling message is further based on an ingress characteristic indicative of how the incoming signaling message was received at the network node, and
in the second configuration, the manipulating the outgoing signaling message is further based on an egress characteristic indicative of how the outgoing signaling message is to be outputted from the network node.

6. The method according to claim 1, wherein:
in the first configuration, the manipulating the incoming signaling message is performed independently of an ingress characteristic indicative of how the incoming signaling message was received at the network node, and
in the second configuration, the manipulating the outgoing signaling message is performed independently of an egress characteristic indicative of how the outgoing signaling message is to be outputted from the network node.

7. A method according to claim 1, wherein:
the network node comprises a first further message manipulation function, the first further message manipulation function being configured to manipulate signaling messages according to one or more first further pre-defined message manipulation rules, and
in the first configuration, the first further message manipulation function is comprised in the egress processing part, and, in the second configuration, the first further message manipulation function is comprised in the ingress processing part.

8. The method according to claim 7,
wherein, in the first configuration, the method comprises, at the egress processing part:
determining an ingress characteristic indicative of how an incoming signaling message has been received at the network node; and
manipulating, using the first further message manipulation function, an outgoing signaling message based on the determined ingress characteristic, and
wherein, in the second configuration, the method comprises, at the ingress processing part:
determining an egress characteristic indicative of how an outgoing signaling message is to be outputted from the network node; and
manipulating, using the first further message manipulation function, an incoming signaling message based on the determined egress characteristic.

9. The method according to claim 1, wherein:
the network node comprises a second further message manipulation function, the second further message manipulation function being configured to manipulate signaling messages according to one or more second further pre-defined message manipulation rules, and
the method further comprises:

manipulating, using the second further message manipulation function, an incoming signaling message based on an ingress characteristic indicative of how the incoming signaling message has been received at the network node; or
manipulating, using the second further message manipulation function, an outgoing signaling message based on an egress characteristic indicative of how the outgoing signaling message is to be outputted from the network node.

10. The method according to claim 1, wherein:
in the first configuration, the outgoing signaling message is generated by the core processing part based on the manipulated incoming signaling message, and
in the second configuration, the outgoing signaling message is generated by the core processing part based on the incoming signaling message.

11. The method according to claim 1, wherein:
in the first configuration, the manipulating the incoming signaling message affects processing performed by the core processing part, and
in the second configuration, the manipulating the outgoing signaling message affects processing performed by a further network node.

12. The method according to claim 1, wherein:
in the first configuration or second configuration, the incoming signaling message or the outgoing signaling message conforms to a session-based protocol, and
the session-based protocol comprises one or more of a session initiation protocol (SIP), simple mail transfer protocol (SMTP), and Diameter.

13. The method according to claim 1, wherein the ingress characteristic or the egress characteristic relates to one or more of a local port, a remote port, a local network address, a remote network address, a transaction, a customer, a transport type, a range of network addresses, a remote network node, and a cluster of network nodes.

14. The method according to claim 1, further comprising determining one of the ingress characteristic and the egress characteristic using the other of the ingress characteristic and the egress characteristic.

15. The method according to claim 1, wherein the ingress characteristic is different from the egress characteristic.

16. The method according to claim 1, wherein:
in the first configuration, the manipulating the incoming signaling message comprises modifying a header of the incoming signaling message, and
in the second configuration, the manipulating the outgoing signaling message comprises modifying a header of the outgoing signaling message.

17. The method according to claim 1, wherein:
in the first configuration, the manipulating the incoming signaling message comprises modifying a body of the incoming signaling message, and
in the second configuration, the manipulating the outgoing signaling message comprises modifying a body of the outgoing signaling message.

18. An apparatus comprising:
at least one processor; and
at least one memory including computer program code,
wherein the at least one memory and the computer program code are configured to, with the at least one processor, cause the apparatus to perform operations for processing signaling messages in a network node in a telecommunications network,
wherein the network node comprises:

a core processing part operable to perform a core processing function of the network node;
an ingress processing part operable to:
 receive incoming signaling messages; and
 output signaling messages to the core processing part;
an egress processing part operable to:
 receive outgoing signaling messages from the core processing part; and
 output signaling messages for transmission from the network node; and
a message manipulation function configured to manipulate signaling messages according to one or more pre-defined message manipulation rules,
wherein, in a first configuration of the network node the message manipulation function is comprised in the ingress processing part, and in a second configuration of the network node the message manipulation function is comprised in the egress processing part, and
wherein the at least one memory and the computer program code are configured to, with the at least one processor, cause the apparatus to:
 in the first configuration, at the ingress processing part perform the following:
  determining an egress characteristic indicative of how an outgoing signaling message is to be outputted from the network node; and
  manipulating an incoming signaling message based on the determined egress characteristic; and
 in the second configuration, at the egress processing part perform the following:
  determining an ingress characteristic indicative of how an incoming signaling message has been received at the network node; and
  manipulating an outgoing signaling message based on the determined ingress characteristic.

19. The apparatus according to claim 18, wherein:
the network node comprises a session border controller (SBC), and
the core processing part performs an SBC function.

20. A computer program product comprising a non-transitory computer-readable storage medium having computer-readable instructions stored thereon, the computer-readable instructions being executable by a computerized device to cause the computerized device to perform operations for processing signaling messages in a network node in a telecommunications network,
wherein the network node comprises:
 a core processing part operable to perform a core processing function of the network node;
 an ingress processing part operable to:
  receive incoming signaling messages; and
  output signaling messages to the core processing part;
 an egress processing part operable to:
  receive outgoing signaling messages from the core processing part; and
  output signaling messages for transmission from the network node; and
 a message manipulation function configured to manipulate signaling messages according to one or more pre-defined message manipulation rules,
wherein, in a first configuration of the network node, the message manipulation function is comprised in the ingress processing part, and in a second configuration of the network node, the message manipulation function is comprised in the egress processing part, and
wherein the operations comprise:
 in the first configuration, at the ingress processing part performing the following:
  determining an egress characteristic indicative of how an outgoing signaling message is to be outputted from the network node; and
  manipulating an incoming signaling message based on the determined egress characteristic; and
 in the second configuration, at the egress processing part performing the following:
  determining an ingress characteristic indicative of how an incoming signaling message has been received at the network node; and
  manipulating an outgoing signaling message based on the determined ingress characteristic.

* * * * *